C. F. DAVIS.
SEALING AND STAMPING MACHINE.
APPLICATION FILED DEC. 26, 1908.

1,011,887.

Patented Dec. 12, 1911.
6 SHEETS—SHEET 1.

WITNESSES.
Albert G. Piegenkowski.
Ray E. Curly.

INVENTOR.
Charles F. Davis
By Horatio E. Bellows
ATTORNEY.

C. F. DAVIS.
SEALING AND STAMPING MACHINE.
APPLICATION FILED DEC. 26, 1908.
1,011,887.
Patented Dec. 12, 1911.
6 SHEETS—SHEET 2.
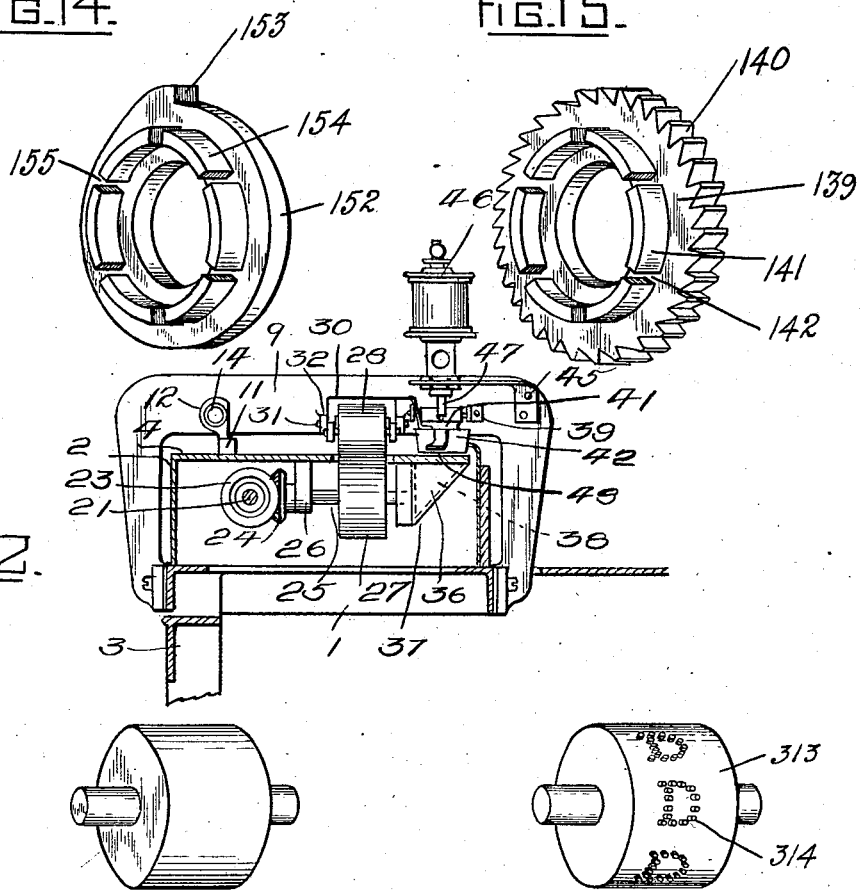
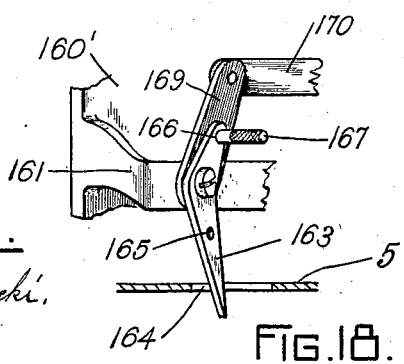
WITNESSES.
Albert G. Regenthowski.
Ray C. Curly.
INVENTOR.
Charles F. Davis
By Horatio E. Bellows
ATTORNEY.

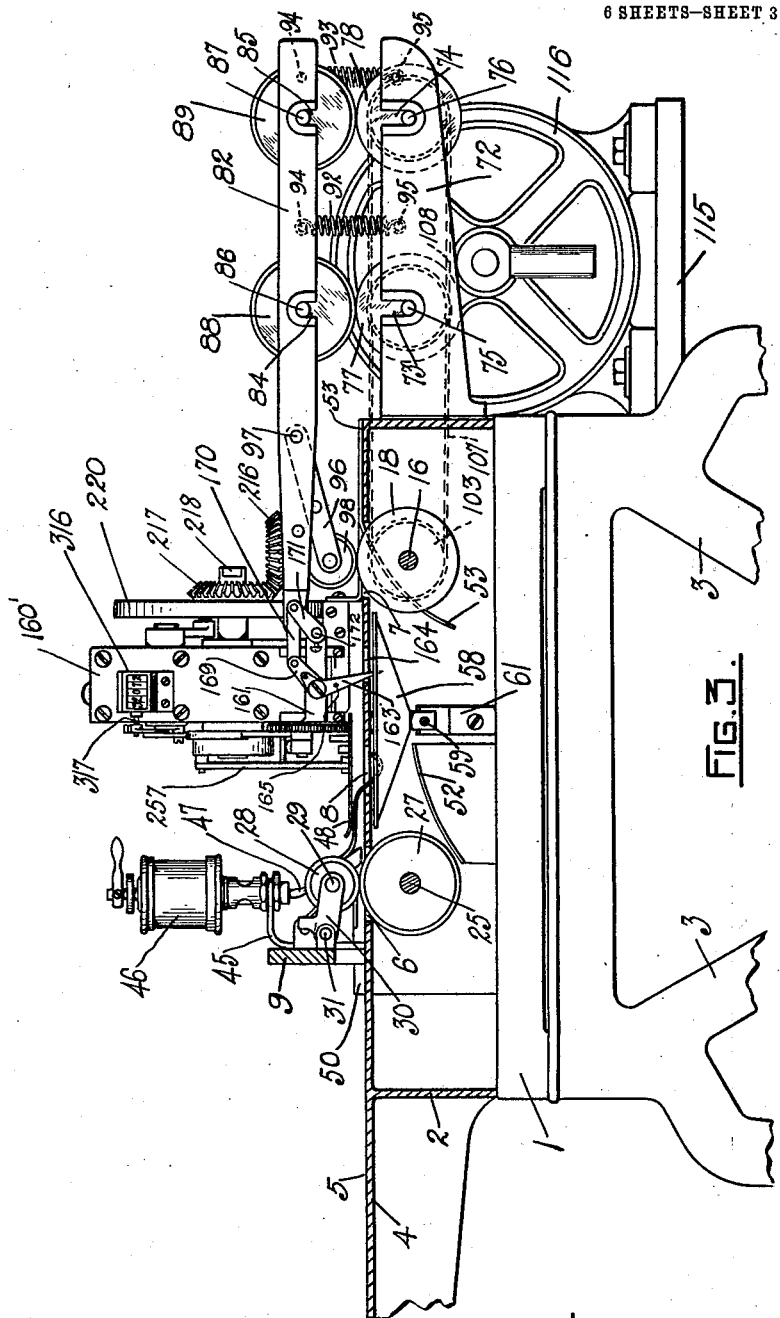

C. F. DAVIS.
SEALING AND STAMPING MACHINE.
APPLICATION FILED DEC. 26, 1908.

1,011,887.

Patented Dec. 12, 1911.

WITNESSES.
Albert G. Regenthowski
Ray E. Curly

INVENTOR.
Charles F. Davis
By Horatio E. Bellows
ATTORNEY.

C. F. DAVIS.
SEALING AND STAMPING MACHINE.
APPLICATION FILED DEC. 26, 1908.

1,011,887.

Patented Dec. 12, 1911.
6 SHEETS—SHEET 5.

WITNESSES.
Albert G. Piezentkowski
Ray E. Curly

INVENTOR.
Charles F. Davis
By Horatio E. Bellows
ATTORNEY.

C. F. DAVIS.
SEALING AND STAMPING MACHINE.
APPLICATION FILED DEC. 26, 1908.
1,011,887.
Patented Dec. 12, 1911.
6 SHEETS—SHEET 6.
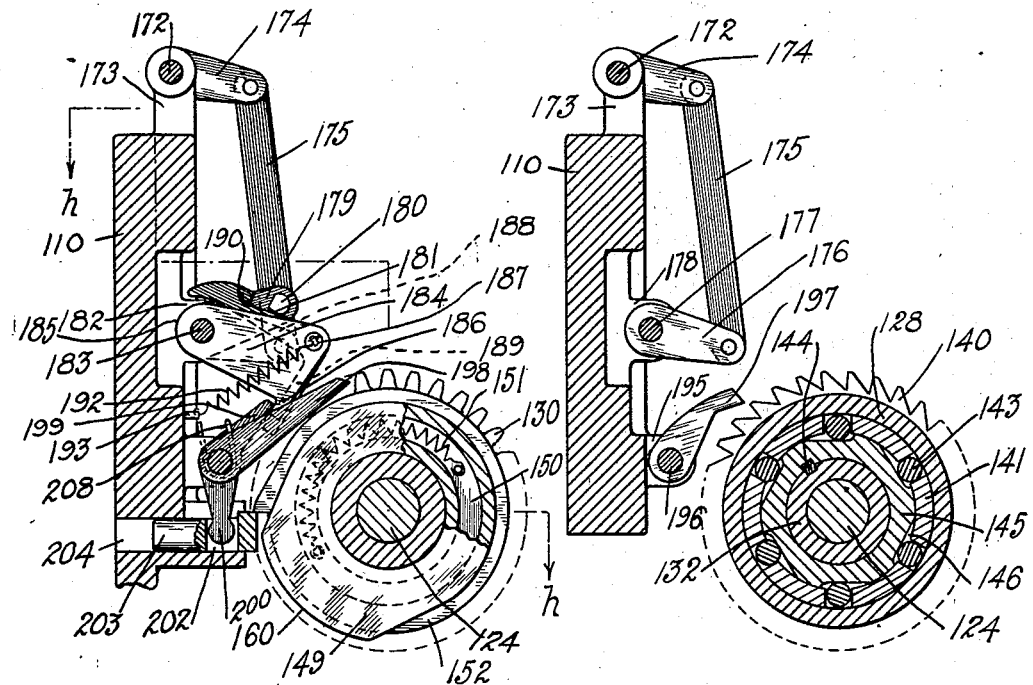
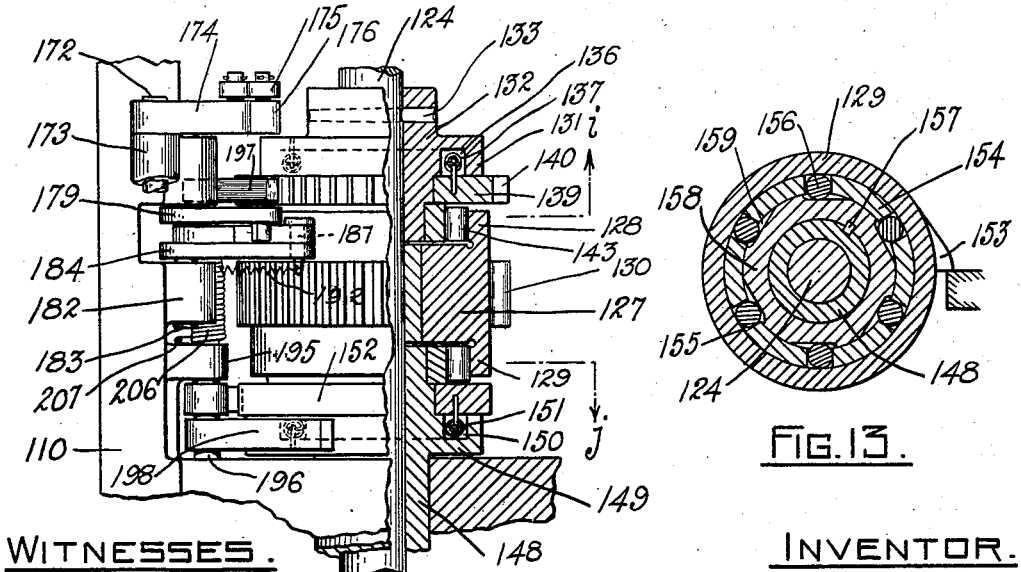
WITNESSES.
Albert J. Pregentkowski.
Ray E. Curly.
INVENTOR.
Charles F. Davis
By Horatio E. Bellows
ATTORNEY.

UNITED STATES PATENT OFFICE.

CHARLES F. DAVIS, OF PROVIDENCE, RHODE ISLAND, ASSIGNOR TO AUTOMATIC ENVELOPE SEALING AND STAMPING MACHINE COMPANY, A CORPORATION OF RHODE ISLAND.

SEALING AND STAMPING MACHINE.

1,011,887.     Specification of Letters Patent.     Patented Dec. 12, 1911.

Application filed December 26, 1908. Serial No. 469,400.

*To all whom it may concern:*

Be it known that I, CHARLES F. DAVIS, a citizen of the United States, residing at Providence, in the county of Providence and State of Rhode Island, have invented certain new and useful Improvements in Sealing and Stamping Machines, of which the following is a specification.

My invention relates to machines for affixing stamps or labels to cards, envelops, packages and the like, and for sealing the flaps of envelops.

The principal object of my invention is to provide a simple, efficient, economic, and convenient machine for sealing and stamping or labeling articles of all kinds, and for marking stamps or labels.

Invention consists essentially in a novel means for sealing the flap of an envelop and discharging the same; in novel means for advancing the stamp or label strip to the shearing knives; in means for insuring against accidental displacement of the strip relatively to the shearing knives; in indexing means for the strip; in clamping the stamp after severance from the strip by the plunger; in means for marking the stamps; and in improved means for recording the number of stamps affixed.

Invention consists further in the novel features, parts, and combinations of the same, set forth in the following specification and particularly pointed out in the claims thereof.

Figure 1:
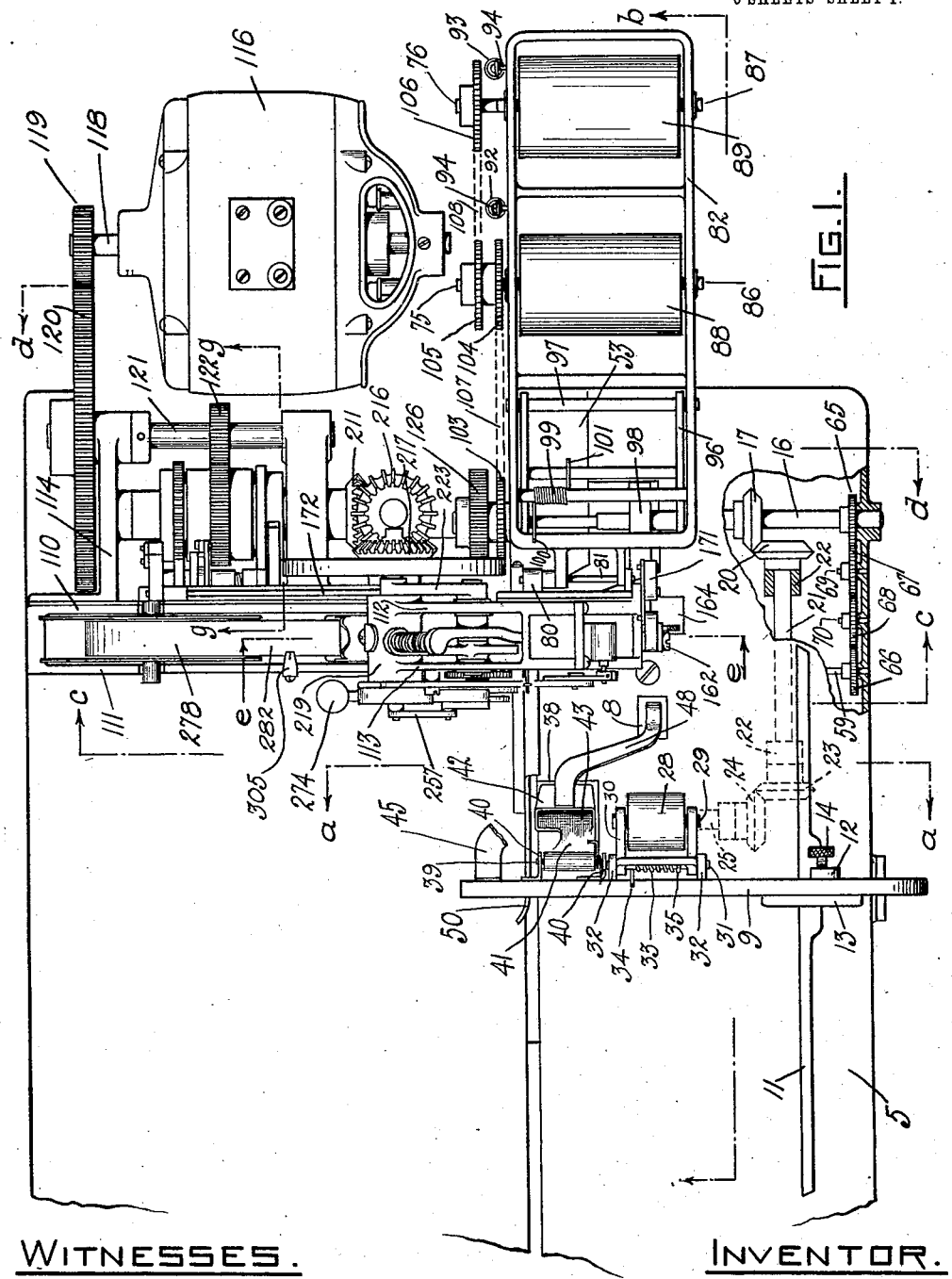
Figure 6:
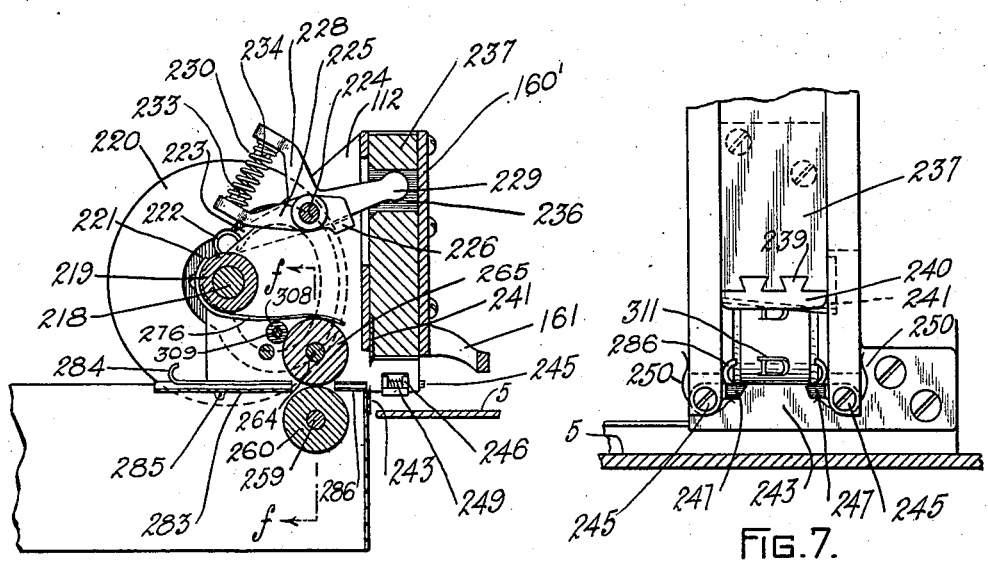
Figure 8:
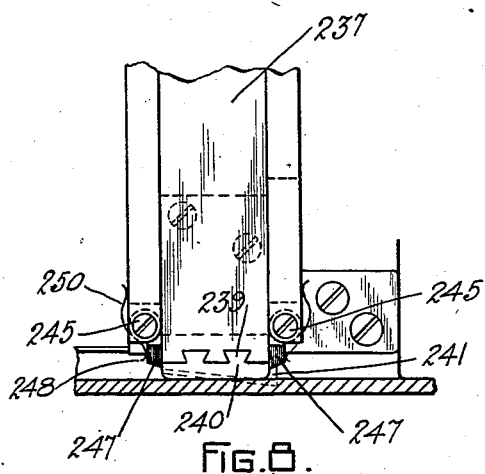
Figure 9:
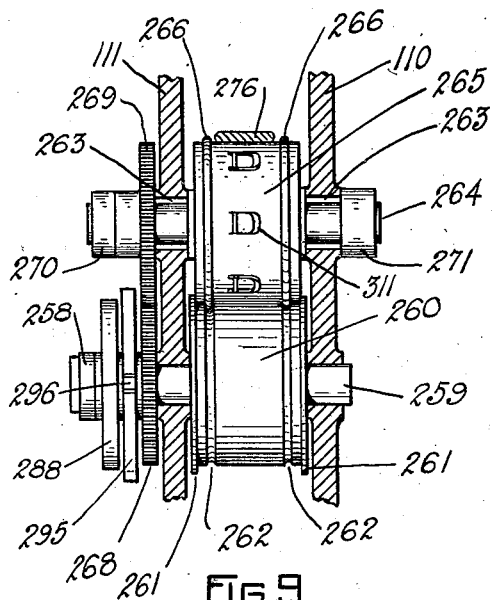

An embodiment of my novel machine is shown in the accompanying drawings, wherein, Figure 1 is a plan view of my machine, with parts of the run shown broken away, and one reservoir omitted, Figs. 2, 3, 4, 5 and 6, sections on lines *a a*, *b b*, *c c*, *d d* and *e e*, respectively, of Fig. 1, Fig. 7, a front view of the lower portion of the plunger and adjacent parts with the front plate removed, and the plunger elevated, Fig. 8, a like view of the same with the plunger in lowest position, Fig. 9, a section on line *f f* of Fig. 6, showing the feed rolls in elevation, Fig. 10, a section on line *g g* of Fig. 1 showing parts broken away, Fig. 11, a section on line *h h* of Fig. 10, Figs. 12 and 13, sections on lines *i i* and *j j* respectively of Fig. 11, Figs. 14 and 15, perspective views of the clutch disks, Figs. 16 and 17, detail views of the two forms of canceling rolls, and Fig. 18, a detail of the tripping finger.

Like characters of reference indicate like parts throughout the views.

The run for the article to be stamped may be a shelf upon the machine frame 1, or a casing, 2, mounted upon the frame, which is supported by standards, 3. The casing roof, 4, constitutes a run, and is extended to form a table, 5. The shelf or run, 4, has two transversely disposed openings, 6 and 7, and an intermediate opening, 8. A transversely disposed bar or yoke, 9, is fixed at its ends to the frame and spans the run. Resting upon the run is a guide rod, 11, provided with vertical ears, 12, 13, adapted to slidably embrace the opposite faces of the yoke, 9. In one ear, 12, is a set screw, 14, by which the rod is adjustable relatively to the front of the run.

The operating mechanism for advancing the article to be stamped comprises a shaft, 16, transversely mounted in the walls of the casing near its end. Fixed upon this shaft is a gear, 17, and a feed roller, 18, the latter provided with a rough or milled periphery, 19. The gear, 17, engages a gear, 20, upon the end of shaft, 21, mounted in lugs, 22, upon the casing roof. A gear, 23, in the opposite end of shaft, 21, engages a gear, 24, upon a shaft, 25, mounted in lugs or bearings, 26, projecting from the casing roof. Upon shaft, 25, is fixed a feed roll, 27, preferably of rubber. A companion rubber faced roll, 28, rests upon the periphery of roll, 27, mounted on a shaft, 29, journaled in a frame, 30, loose upon a rod, 31, fixed in lugs, 32, upon the yoke, 9. The frame, 30, with its roll, 28, is pressed against roll, 27, by a helical spring, 33, upon the rod, 31, having one end, 34, bearing against the yoke, and its other end, 35, against the frame.

Fixed in the run at one side of roll, 28, is a receptacle, 36, having a tapering side, 37, containing a moistening pad, 38. Above the pad is a device for moistening the surface of the article at the point which is to receive the stamp. A rod, 39, is fixed in ears, 40, upon the yoke, 9, on which is loosely mounted an arm, 41, having a downwardly inclined tapering holder, 42, in which is a wick, 43, brush, or absorbent material and which normally rests upon the pad, 38.

Fixed to the yoke, 9, is an arm, 45, upon which is fixed a reservoir, 46, whose discharge pipe or opening, 47, is immediately above the open top of the holder, 42, whereby the wick is moistened. A downwardly inclined arm, 48, upon the holder projects through the opening, 8, in the run. The described feeding rolls are actuated from the shaft, 16, through the shafts, 21 and 25.

For the purpose of directing an envelop flap when an envelop is fed, a vertical guide plate, 50, is fixed by a screw, 51, or otherwise to the rear wall of the casing adjacent the moistening device. A second deflecting plate, 52, is fixed to an intermediate portion of the rear wall of the casing, longitudinally disposed, and upwardly inclined. A third deflecting plate, 53, is mounted upon the run and curves downwardly through the opening, 7, in the run contiguous to the rear wall of the casing.

Figure 4:
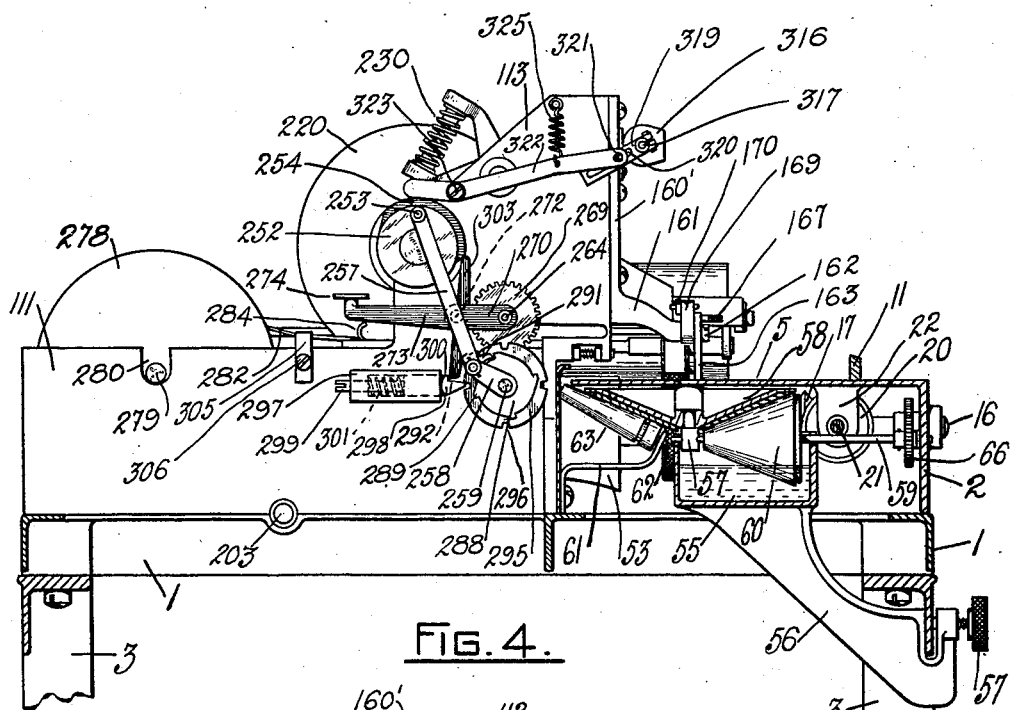
Figure 5:
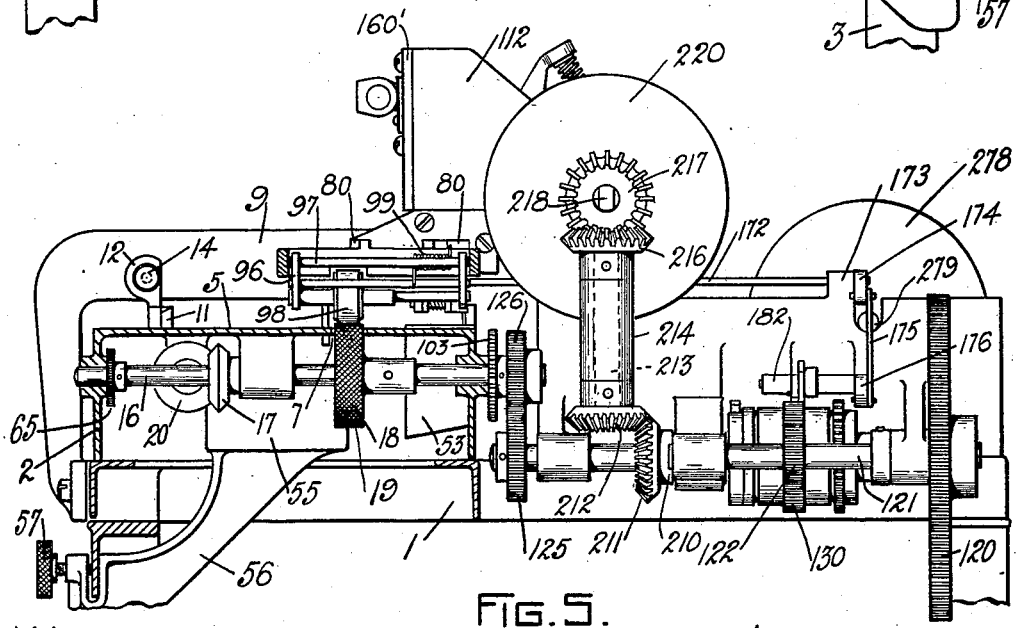

The device for moistening envelop flaps, as shown in Fig. 4, comprises a rectangular open reservoir, 55, supported upon an arm, 56, clamped by a screw, 57, to the front of the frame or casing. The reservoir is midway the length of the casing. Immediately above the same downwardly projecting from the casing is a stud, 57, upon which is revolubly mounted a conical shaped roll, 58, covered with absorbent material. Fixed upon a shaft, 59, mounted in the walls of the reservoir, 55 and stud, 57, is a conical rubber roller, 60, adapted to contact with the surface of roll, 58. Supported at one end by the wall of the casing and at its other end by a bracket, 61, fixed to the wall is an inclined shaft, 62, upon which is rotatably mounted a metallic friction roll, 63, also adapted to contact with the roll, 58, and in the path of the envelop flap. Fixed to shafts, 16 and 59, respectively are gears, 65 and 66, connected by two intermediate pinions, 67 and 68, mounted respectively upon studs, 69 and 70, in the casing. Through these gear connections and the shaft, 59, the moistening roll, 60, rotates the roll, 58.

Upon the end of the casing opposite the shelf is a horizontal bracket, 72, provided with two sets of bearing slots, 73 and 74, in the upper margins of its side walls to receive the shafts, 75 and 76, of rubber faced sealing rolls, 77, and 78, respectively. Upon the side of the machine frame, 1, or elsewhere above the run, are lugs, 80, in which is mounted a rod, 81, to which is pivoted a horizontal frame, 82, whose side walls are provided with two sets of vertical marginal bearing cavities, 84 and 85, in which are journaled the shafts or hubs, 86 and 87, respectively, of rollers, 88 and 89, covered with blotting material. The rolls, 88 and 89, are pressed into contact with the rolls, 77 and 78, by two retractile springs, 92, 93, whose ends are attached to pins, 94, in the frame and 95 in the bracket. An auxiliary frame, 96, is pivoted at one end to a cross rod, 97, in the frame 82. Rotatably mounted upon the opposite end of the frame, 96, is a rubber roller, 98, resting upon the roll, 18, and maintained in contact therewith by a spring, 99, one of whose ends, 100, bears upon the frame, 82, and its other end, 101, upon the frame, 96. The rolls, 98, 18, feed the article stamped to the rolls, 88, 89, 77, 78, which both seal a flap and deliver the article. By virtue of the auxiliary spring pressed frame the feed rolls, 98, 18, are in constant contact regardless of the degree of separation of the rolls, 88, 89, from rolls, 77, 78, occasioned by the passage through the latter of bulky articles. The last-mentioned rolls are driven from the shaft, 16, as follows: Shafts, 16 and 86, are provided with sprocket wheels, 103, and 104, respectively. Shaft 86 has also a sprocket wheel, 105; and shaft 87 a like wheel, 106. Wheels 103, 104 are connected by chain 107; and wheels, 105, 106, by chain, 108.

When the article to be sealed is an envelop it is initially advanced along the run by rolls, 27 and 28, while a forward corner is being moistened by the wick, 43. The forward edge of the advancing envelop elevates the arm, 48, and retains the wick out of contact with the envelop until the latter has passed beyond the arm. The envelop flap, guided by the plate, 52, passes between the moistening roll, 58 and roll, 63. The flap is guided toward the envelop after moistening by the plate, 53. During its described advance the envelop contacts with a tripping device which will be hereinafter described which causes a mechanism to be actuated. In this instance the described sealing mechanism is shown operatively connected with a stamping mechanism, but it may be located and operated independently of the latter.

The stamp or label feeding and affixing mechanism are mounted in a portion of the frame adjacent the run, right angularly disposed with relation to the casing, 2, and comprising parallel walls, 110 and 111, provided respectively with forwardly extending uprights, 112 and 113. Upon the wall, 110, is a bracket, 114, for supporting a clutch driving mechanism. Upon an extended portion of the frame, 115, is mounted a motor, 116, for driving the machine, but the driving agent may be located at other convenient points and may be of any character, such as a crank. In this instance, the motor shaft 118 through pinion, 119, drives the gear, 120, of shaft, 121, mounted in bracket, 114, and provided with a pinion, 122. Mounted in bracket, 114, is a driving shaft, 124, upon which is a gear, 125, meshing with a gear, 126, fixed upon and driving the shaft, 16. Upon shaft 124 is a clutch device for throwing into and out of operation the stamp feeding and affixing mechanisms. While the clutch may be of any preferred type, the form herein shown in Figs. 10 to 15 inclusive, comprises a friction clutch, driving member, 127, loose on shaft, 124, provided with laterally extending flanged portions, 128 and 129 upon its face, and a row of gear teeth, 130, upon its periphery meshing with gear, 122. Adjacent one side of the member, 127, is a complementary faced clutch member comprising a disk, 131, integral with a hub, 132, fixed to the shaft, 124, by a pin, 133. Disk 131 is provided with an arcuate channel, 136, wherein is a helical spring, 137, having one end fastened to the disk, 131, and the other end, to an annular disk or ring, 139, slidably mounted upon the hub, 132, adjacent the disk, 131, and caused to rotate therewith by the spring, and provided with peripheral ratchet teeth, 140. Upon its side face are segments, 141, extending within the flange, 128, and intermediate seats, 142, which contain the rolls, 143. Fixed to the hub, 132, by a key, 144, and within the segments is a spider, 145, provided with angular peripheral seats, 146, in which the rolls, 143, rest when the clutch is disengaged. Adjacent the other side of the loose member, 127, is a second complementary clutch member substantially similar to member last described, comprising a hub, 148, loose upon shaft 124 and provided with an integral disk, 149, having a channel, 150, and spring, 151, connecting the disk with an annular disk or ring, 152, slidable upon the hub and movable therewith by virtue of the spring, 151. Upon the periphery of the ring is an inclined tooth, 153, and upon its side extending within flange, 129, are segments, 154, with intermediate openings, 155, containing rolls, 156. A key, 157, connects the sleeve, 148, with a spider, 158, having inclined seats, 159, for the rolls, 156. The disk, 149, has an arcuate elevation, 160, upon its periphery, constituting a cam.

The operation of the clutch parts are as follows: When the ring, 139, which is normally held against rotation, is released, the spring, 137, rotates this ring and its segments thereby forcing the rolls, 143, into frictional engagement with the flange, 128, of the driving member and with the angular seats, 146, of the spider. Thus the parts are clamped and rotate with the shaft until the ring, 139, is checked. In a similar manner the ring, 152, when released, is engaged through the rolls, 156, with the flange, 129, of the driving member, 127, and rotates with the sleeve, 148, until checked.

The envelop feeding and delivering mechanism is driven through the shaft, 124, and clutch member, 132; and the stamp feeding and affixing mechanism through the clutch member, and sleeve, 148. The means for throwing the clutch members into operation is the following: Upon the lower part of a face plate, 160', upon the uprights, 112, 113, is a bracket, 161, having a stud or screw, 162, upon which is pivoted a depending finger, 163, whose lower end extends into an opening, 164, in the run, 4, and is provided with an orifice, 165, and whose upper end is also provided with an orifice, 166, through which passes a removable pin, 167, adapted to enter a cavity in the arm, 169, loose on the stud, 162. The finger, 163, is normally in the path of the envelop passing upon the run, as shown, but when it is not desired to stamp the envelop the depending finger is raised until the orifice, 165, registers with the cavity in the arm, 169, and the pin, 167, is introduced therein. A link, 170, connects the arm, 169, with an arm, 171, fixed to the end of a rod, 172, which is loosely mounted near one end in the bracket, 161, and near its opposite end in a bearing, 173, upon the wall, 110. Fixed to the rear end of the rod, 172, is an arm, 174, connected by a link, 175, to an arm, 176, upon the end of a rod, 177, revolubly mounted in an ear, 178, upon the wall, 110. Upon the rod, 177, is an arm, 179, provided near its end with a stud, 180, having an angular face, 181, as shown in Fig. 10. Upon the wall, 110, in alinement with the ear, 178, is an ear or bearing, 182, in which is journaled a rod, 183. Fixed to the end of this rod is a broad angular arm or plate, 184, having a hub, 185, and provided upon its lower portion with a shoulder or projection, 186. Pivoted upon the outer end of the plate, 184, by a pin 187, is a lever comprising two arms, 188 and 189. The arm, 188 normally rests upon the hub 185, and is provided with a hook or shoulder 190. The lever arm 189, is contiguous with the plate, 184, and projects slightly below the projection, 186, of the latter. The plate, 184, is normally rearwardly and downwardly pressed by a spiral spring, 192, having one end fixed to the pin, 187, and the other to a lug, 193, upon the wall, 110. Below the last described parts are lugs, 195, 195, in which is revolubly mounted a shaft, 196, upon which is fixed a pawl, 197, adapted to engage the teeth, 140, of the ring, 139. Another pawl or pallet, 198, is fixed to this shaft and adapted to rest upon the cam face of disk, 149. A finger, 199, fixed to this shaft is adapted to rest against the projection, 186, when the plate, 184, is depressed, and is in the path of the end of the lever arm, 189, whose upper arm, 188, is located to coöperate with the stud, 180. The end of a depending arm, 200, fixed to shaft, 196, enters loosely a recess, 202, of a block, 203, slidably mounted in an opening, 204, in the wall, 110. This block is slidable into and out of the path of the tooth, 153, of the ring, 152. The pawls, 197, 198, and finger, 199, are downwardly pressed, and the arm, 200, rearwardly swung by a helical spring, 206, upon shaft, 196, one of whose ends, 207, rests against the wall, 110, and whose other bent end, 208, bears against the finger, 199.

The operation of the described clutch operating or tripping mechanism is as follows: The parts are in the position shown in Figs. 10 and 12, and the envelop feeding, moistening and delivering mechanisms are in operation by virtue of the engagement of the clutch member, 132, with the driving member, 127. When, however, the envelop in its passage over the run contacts with and moves the finger, 163, the impulse is communicated through arm, 169, link 170, arm 171, rod 172, arm 174, link 175, arm 176, and rod 177, to the arm 179, which is thereby forced rearwardly, into engagement with the shoulder, 190, of the lever arm, 188, which upwardly pulls the plate, 184, against the tension of spring, 192, and releases the finger, 199, from the projection, 186, permitting the shaft, 196, to turn under the influence of spring, 206. This movement of the shaft, 196, throws the pawl, 197, into engagement with teeth, 140, thereby releasing clutch, 132, and throwing out of operation the envelop feeding mechanism. This shaft movement simultaneously retracts the slide, 203, which releases the finger, 153, whereby the clutch, 149, which actuates the stamp feeding and affixing mechanisms, is put into operation. The movement of the shaft, 196, referred to also forces the pawl 198 against the periphery of the rotating disk, 149. While the pawl is in this position, as will be hereinafter described, a single stamp is being fed and affixed to the envelop, but when in its travel the cam elevation, 160, near the end of a single rotation, reaches the pawl, 198, the latter is rearwardly forced, returning the parts through the shaft, 196, to their original positions, there to remain unless or until another envelop contacts with the finger.

Reference is now made to the stamp operating mechanism. The hub, 148, is extended to form a sleeve, 210, upon whose end is a gear, 211, meshing with a gear, 212, upon the lower end of a vertical shaft, 213, mounted in a bracket, 214, upon the wall, 110. A gear, 216, upon the upper end of this shaft meshes with a gear, 217, upon the end of a shaft, 218, mounted in a bearing, 219, in the uprights of the frame. Fixed upon the shaft, 218, is a cam disk, 220, provided with a channel, 221, in which travels a cam roll, 222, upon the end of an arm, 223, fixed to a shaft, 224, mounted in the uprights. Also fixed intermediate its length to the shaft, 224, is an arm, 225, upon whose forward end is a lateral lug, 226. Loose upon the shaft, 224, adjacent the arm, 223, is mounted an angle lever comprising a rearwardly directed arm, 228, and a forwardly directed arm, 229, the latter resting upon the lug, 226. A compression spring, 230, is located between the outer ends of arms, 223 and 228, and is held in position by studs, 233 and 234, upon the respective arms. The end of arm, 229, enters an orifice, 236, in a stamp affixing plunger, 237, mounted to reciprocate in the frame between the uprights. Thus the plunger operating arm, 229, by virtue of the spring, 230, is yielding to a certain degree, so that when an unusually thick envelop or receptacle is operated upon binding is avoided. Fixed in dovetailed grooves, 239, in the bottom of the plunger is a cap or pad, 240; and upon the rear side of the plunger is shearing blade, 241. A second blade, 243, is fixed to the forward portion of the frame to coact with the blade, 241, in shearing the stamps when the plunger descends. For the purpose of maintaining the severed stamp against the face of the pad during the descent of the plunger from the shearing point the following device is employed. In the lower part of frame adjacent each side of the plunger a pin, 245, passes loosely through ears, 246, upon a horizontal plate, 247. This plate is supported by the end, 248, of a spring, 249, upon the pin, 245. The opposite end, 250, of the spring bears against the wall of the body. The operation of these pivoted plates is shown in Figs. 7 and 8.

The stamp or label feeding and indexing mechanism is actuated through the shaft, 218, upon whose end is mounted a crank disk, 252, having crank pin, 253, and provided upon its periphery with a cam shoulder, 254. A connecting rod, 257, joins the pin, 253, to an arm, 258, loose on the end of a shaft, 259, mounted in the frame walls, 110, 111. Upon this shaft between the walls as shown in Fig. 9 is fixed a roll, 260, provided preferably with end flanges, 261, and two annular grooves, 262. In the walls above this roll are slightly oblong openings, 263, in which rests a shaft, 264, upon which is fixed a roll, 265, provided with annular ribs, 266, adapted to register in grooves, 262. The ends of roll, 265, abut against the sides of flanges, 261. These rolls feed the stamp strip forward to the shearing knives; and the flanges, 261, assist in guiding the strip in its advance, while the ribs, 266, longitudinally straighten the strip. Upon shaft, 259, is a gear, 268, which engages and drives a gear, 269, fixed to shaft, 264. The latter shaft is journaled in the forward end of a frame comprising side bars, 270, 271, and a cylindrical end bar, 272, pivoted in the frame. The bar, 270, is extended to form an arm, 273, provided upon its end with a thumb rest, 274, as shown in Fig. 4. The manual depression of the thumb-piece elevates the shaft, 264, in its slots, 263, thereby slightly interspacing rolls, 260, 265, to permit the insertion between the two of a new stamp strip. The gear, 269, is normally held in mesh with gear, 268, by a flat spring, 276, fixed to the bearing, 219, and resting upon the roll, 265.

The labels or stamps are supplied in a continuous strip from a reel or roll, 278, whose hubs, 279, are loosely mounted in slots, 280, in the frame walls. The stamp strip, 282, passes to the feed rolls through a tubular guide plate, 283, shown in Fig. 6, provided upon its outer end with an upturned lip, 284. The tube is fixed to the walls, by pins, 285, or other convenient means, in the plane of the top of roll, 259. Intermediate the rolls and the plunger is located a second plate, 286, in alinement with the first over which the strip passes to the knives. In this instance, the periphery of the feeding roll, 260, is the length of four stamps or labels, so that a quarter revolution of the roll advances the strip to the knives the distance of one stamp. This step by step or intermittent rotary movement is imparted to the roll as follows: A ratchet or toothed disk, 288, is fixed to the shaft, 259, adjacent the arm, 258, and is provided with four teeth, 289, located 90 degrees from each other upon its periphery. Pivoted to the arm, 258, is a pawl, 291, pressed by a spring, 292, against the periphery of disk 288. Thus each reciprocation of the rod, 257, advances the roll, 260, a quarter turn.

In order to insure that the strip shall be sheared at the exact line of perforations or other marks of division upon the strip it is essential to prevent overrotation or backlash of the roll, 260. To this end an indexing or locking device is provided. Fixed to the shaft, 259, is a disk, 295, provided with four recesses, 296, equi-distant from each other upon the margin thereof. In a sleeve, 297, upon the wall, 111, is slidably mounted a bolt comprising a head, 298, and shank, 299. The head is provided with a shoulder, 300, near its end. A spiral spring, 301, upon the shank, 299, presses against the head and the end of the sleeve, normally forcing the end of the bolt against the margin of the disk, 295. Pivoted intermediate its length to the bar, 272, is a lever, 303, whose upper end bears against the periphery of disk, 252, in the path of cam shoulder, 254, and whose lower end bears against the shoulder, 300, of the locking bolt. The cam shoulder, 254, is so timed that the bolt is rearwardly forced out of a slot, 296, and retained out of engagement with its disk during a quarter turn advance of the pawl, whereupon the bolt is released and forced under pressure of spring, 301, into the next slot, thus holding the disk, 295, rigid during the receding movement of the pawl arm. To assist in adjusting the strip so that its lines of division shall be in the line of the vertical plane of the shearing blades, an index finger, 305, fixed by a screw, 306, to the wall, 111, overhangs the path of the strip near the reel. For marking purposes, a roll, 308, is mounted upon a shaft, 309, in the walls of the frame with its periphery in contact with the feeding roll, 265. When marking is by ink, the usual inking roll, as shown in Fig. 6, is employed. The periphery of roll, 265, is provided, as shown in Fig. 9, with four projections, 311, for receiving the ink. When marking is by perforation, the marking roll, 313, as shown in Fig. 17, has projecting teeth.

For registering the number of stamps affixed, a usual form of registering device, 316, is fixed to the front of the machine whose operating shaft, 317, has upon its end a bar, 319, provided with a slot, 320, in which moves a pin, 321, upon the end of a lever, 322, pivoted to a pin, 323, intermediate its length upon the frame. The end of lever, 322, is in the path of cam shoulder, 254, which operates the registration in conjunction with a spring, 325, fixed at its ends to the lever, 322, and the frame above the lever.

It is of advantage that the stamp strip, which has a natural tendency to longitudinally and transversely roll or curve in its travel, should be delivered perfectly flat and straight to the stamp affixing mechanism. This end is attained by the ribs, 266, and grooves, 262, upon the feed rolls which crease the strip.

When it is desired to use the sealing mechanism only, the finger, 163, may be turned up out of the path of the envelop and be there held by the pin, 167, passing through the orifice, 165.

While a flat spring, 276, is herein shown as the agent for forcing the roll, 265, down into contact with roll, 160, the particular form and location of this spring may be varied without departing from the spirit of my invention.

What I claim is,

1. In a machine of the type set forth, the combination with a stamp-affixing device, a flap moistener, and means for feeding the envelop to the affixing device, of a sealing device, and intermittently operated means intermediate the affixing and sealing means and independent of the latter for advancing the stamped envelop to the sealing device, shiftable means in the path of the envelop adapted to be thrown out of such path when the envelop is not to be stamped and means for directing an envelop flap.

2. In a machine of the type set forth, the combination with a stamp-affixing device, a flap moistener, and means for feeding the envelop to the affixing device, of a sealing device, in the form of rolls, intermittently operated means intermediate the affixing and sealing means and independent of the latter for advancing the stamped envelop to the sealing device, shiftable means in the path of the envelop adapted to be thrown out of such path when the envelop is not to be stamped and means for directing an envelop flap.

3. In a machine of the type set forth, the combination with a stamp-affixing device, of a flap moistener, means for feeding an envelop to the affixing device, a sealing device, intermittently operated means intermediate the affixing and sealing means and independent of the latter for advancing the stamped envelop to the sealing means, and shiftable means in the path of the envelop adapted to be thrown out of such path when the envelop is not to be stamped.

4. In a machine of the type set forth, the combination with a stamp affixing device, a flap moistening device, and means for feeding the envelop to the affixing device, of a sealing device, means for advancing the stamped envelop to the sealing device, and rotary means for throwing the advancing means out of operation during the operation of the affixing device.

5. In a machine of the type set forth, the combination with a stamp affixing device, a flap moistening device, and means for feeding the envelop to the affixing device, of a sealing device, means independent of the sealing device for advancing the stamped envelop to the sealing device, and means for throwing the sealing device out of operation during the operation of the affixing device.

6. In a machine of the type set forth, the combination with a stamp affixing device, a flap moistening device, and means for feeding the envelop to the affixing device, of a sealing device, means for advancing the stamped envelop to the sealing device, and rotary means for throwing the advancing means and sealing device out of operation during the operation of the affixing device.

7. In a machine of the type set forth, the combination with a stamp affixing device, a flap moistening device, and means for feeding the envelop to the affixing device, of a sealing device, means for advancing the stamped envelop to the sealing device, and means controlled by the passage of the envelop for automatically throwing the sealing device into inoperative position and the stamp affixing device into operative position.

8. In a machine of the type set forth, the combination with a stamp affixing device, a flap moistening device, and means for feeding the envelop to the affixing device, of a sealing device, means for advancing the stamped envelop to the sealing device and means controlled by the passage of the envelop for automatically throwing the advancing means into inoperative position and the stamp affixing device into operative position.

9. In a machine of the type set forth, the combination with a stamp affixing device, a flap moistening device, and means for feeding the envelop to the affixing device, of a sealing device, means for advancing the stamped envelop to the sealing device, and means controlled by the passage of the envelop for automatically throwing the advancing means and sealing device into inoperative position and the stamp affixing device into operative position.

10. In a machine of the type set forth, the combination with a flap moistening device, of sealing rolls, means for advancing the envelop from the moistening device to the sealing rolls, and means for stamping the envelop before it has reached the sealing rolls and rotary means for automatically throwing the sealing rolls out of operation.

11. In a machine of the type set forth, the combination with a stamp affixing device, a flap moistening device, and means for feeding the envelop to the affixing device, of a sealing device, a clutch mechanism adapted to be operated by the advancing envelop for simultaneously throwing the affixing device into operation and the sealing device out of operation, and means for throwing the sealing device into operation immediately after the action of the affixing mechanism.

12. In a machine of the type set forth, the combination with a stamp affixing device and an envelop feeding device, of means adapted to be operated by the advancing envelop for throwing the affixing device into operation and the feeding device out of operation, and means for throwing the feeding device into operation immediately after the action of the affixing mechanism.

13. In a machine of the type set forth, the combination with a reciprocating stamp affixing plunger, and means for reciprocating the plunger, of a device for feeding an envelop to the plunger, and clutch controlled means operating the feeding device and actuating the reciprocating means for stopping the envelop feed and for setting the stamping mechanism into operation.

14. In a machine of the type set forth, the combination with a reciprocating stamp affixing plunger, and means for reciprocating the plunger, of a device for feeding an envelop to the plunger a flap moistening device in the path of the envelop, and clutch controlled means operating the feeding device and actuating the reciprocating means for stopping the envelop feed and for setting the stamping mechanism into operation.

15. In a machine of the type set forth, the combination with a reciprocating stamp affixing plunger and means for reciprocating the same, of envelop flap moistening and sealing devices adjacent the plunger, and clutch controlled means for operating the moistening and sealing devices and actuating the reciprocating means for stopping the envelop feed and for setting the stamping mechanism into operation.

16. In a machine of the type set forth, the combination with a slidable plunger, and means for reciprocating the same, a device for feeding an envelop to the plunger, a flap moistening device intermediate the feeding device and the plunger, an envelop sealing device, clutch controlled means for successively operating the feeding, moistening and sealing devices, and means actuated by the operating means and actuating the reciprocating means said clutch controlled means constructed to stop the envelop feed and also to set the stamping mechanism into action.

17. In a machine of the type set forth, the combination with an envelop feeding device, and an envelop stamp affixing device, of a double clutch, operative connections between the stamp affixing device and one clutch member, a tripping device in the path of the envelop adapted to operate the second clutch member, and means governed by the second clutch member for throwing into operation the first clutch member.

18. In a machine of the type set forth the combination with an envelop feeding device, flap moistening device, and sealing device, of a stamp affixing device, a double clutch, operative connections between the feeding, moistening, and sealing devices and one clutch member, operative connections between the affixing device and the other clutch member, a tripping device in the path of the envelop being fed adapted to operate the second clutch member, and means governed by the second clutch member for throwing into operation the first clutch member.

19. In a machine of the type set forth, the combination with the frame and the envelop run, of a stamp affixing plunger slidably mounted in the frame above the run, a feed roll in the run at one side of the plunger, sealing rolls rotatably mounted in the frame upon the other side of the plunger, a second feed roll in the run intermediate the plunger and sealing rolls, idle sealing rolls yieldingly mounted in contact with the sealing rolls, a main driving shaft in the frame, operative connections between the driving shaft and the feed rolls and sealing rolls, and means actuated by the driving shaft for operating the plunger.

20. In a machine of the type set forth, the combination with the frame and the envelop run, of a stamp affixing plunger slidably mounted in the frame above the run, a feed roll in the run at one side of the plunger, sealing rolls in the frame upon the other side of the plunger, a second feed roll in the run intermediate the plunger and sealing rolls, a roll frame pivotally mounted upon the machine frame above the sealing rolls, idle sealing rolls in the roll frame adapted to coöperate with the sealing rolls, spring means connecting the machine frame and roll frame for forcing the idle rolls into contact with the sealing rolls, a main driving shaft, operative connections between the driving shaft and the feed rolls and sealing rolls, and means actuated by the driving shaft for operating the plunger.

21. In a machine of the type set forth, the combination with the frame and the envelop run of a stamp affixing plunger slidably mounted in the frame adjacent the run, a feed roll in the run at one side of the plunger, sealing rolls in the frame upon the other side of the plunger, a second feed roll in the run intermediate the plunger and sealing rolls, a roll frame pivotally mounted upon the machine frame above the sealing rolls, idle sealing rolls in the roll frame resting upon the sealing rolls, springs connecting the machine frame and roll frame, an auxiliary frame pivotally mounted in the roll frame, a coöperating feed roll mounted upon the auxiliary frame adjacent the second feed roll, and spring means upon the auxiliary frame engaging the roll frame for forcing the coöperating feed roll into contact with the second feed roll.

22. In a machine of the type set forth, the combination with a run for the article to be stamped, and means for affixing a stamp to the article embodying a plunger arm, of an arm fixed on the shaft of the plunger arm, the latter being loose upon its shaft and means engaging said arm and an extension of the plunger arm for preventing a binding of the article by the stamp affixing means.

23. In a machine of the type set forth the combination with the run for the article to be stamped, of a stamp affixing plunger movable against and away from the article, means for feeding a stamp to the plunger, means loosely mounted upon its shaft for actuating the plunger, and means operated by the plunger actuating means for cushioning the blow of the plunger.

24. In a machine of the type set forth, the combination with an operating shaft, of a cam upon the shaft, a rock shaft, an arm fixed to the rock shaft and engaging the cam, an arm fixed intermediate its length upon the rock shaft, a second arm loosely mounted intermediate its length upon the rock shaft, a lug upon the first arm normally supporting the second arm, a compression spring between the outer ends of the arms, and a plunger provided with an oblong orifice in which registers the inner end of the second arm.

25. In a machine of the type set forth, the combination with a direct acting stamp affixing plunger, of sealing rolls for receiving the envelops from said plunger, operative connections between the sealing rolls and said stamp affixing plunger, and a clutch device operatively connected with the sealing rolls for throwing the stamp affixing plunger into operation, means for advancing the stamped envelop to the sealing device and rotary means for automatically throwing the sealing means into inoperative position.

26. In a machine of the type set forth, the combination with a direct-acting stamp-affixing plunger, of rolls for feeding the envelops to the plunger, operative connections between said rolls and plunger, a clutch device operatively connected with the rolls, and a depending finger in the path of the envelop and actuated thereby to actuate the clutch to throw the envelop feeding mechanism out of operation.

27. In a machine of the type set forth, the combination with a direct acting stamp affixing plunger, rolls for feeding the envelops to the mechanism, a flap moistening device coöperating with the rolls, operative connections between the rolls and said stamp affixing plunger, and a clutch device operatively connected with the rolls and operated indirectly by the advancing envelop for throwing the stamp affixing plunger into operation and means actuated by the passing envelop to operate the feed rolls and to throw the same into operation immediately after the action of the affixing mechanism.

28. In a machine of the type set forth, the combination with a direct acting stamp affixing plunger, and means for operating the same, of sealing rolls for receiving the envelops after the action of the plunger, operative connections between the sealing rolls and the plunger operating means, and a clutch device operatively connected with the sealing rolls and operated indirectly by the advancing envelop for actuating the plunger operating means and means actuated by the passing envelop to operate the feed rolls and to throw the same into operation immediately after the action of the affixing mechanism.

29. In a machine of the type set forth, the combination with a direct acting stamp affixing plunger, and means for operating the same, of rolls for feeding the envelops to the plunger, operative connections between the rolls and the plunger operating means, and a clutch device operatively connected with the rolls and operated indirectly by the advancing envelop for actuating the plunger operating means and means actuated by the passing envelop to operate the feed rolls and to throw the same into operation immediately after the action of the affixing mechanism.

30. In a machine of the type set forth the combination with a direct acting stamp affixing plunger, and means for operating the same, of rolls for feeding the envelops, a flap moistening device coöperating with the rolls, operative connections between the rolls and the plunger operating means, and a clutch device and operated indirectly by the advancing envelop operatively connected with the rolls and moistening device for actuating the stamp plunger operating means and means actuated by the passing envelop to operate the feed rolls and to throw the same into operation immediately after the action of the affixing mechanism.

31. In a machine of the type set forth, the combination with a run for the articles to be stamped, of a slidable direct acting stamp affixing plunger above the run, feed rolls for passing a stamp strip into the path of the plunger, and means actuated by the passing article for operating the feed rolls and for throwing the same into operation immediately after the action of the affixing mechanism.

32. In a machine of the type set forth, the combination with a frame, of a stamp affixing plunger in the frame, feed rolls in the frame adapted to advance the end of a stamp strip beneath the plunger a predetermined distance, means for advancing the envelop to a sealing device, and means for throwing the advancing means out of operation during the operation of the affixing device.

33. In a machine of the type set forth, the combination with the frame, of a reciprocating stamp affixing plunger in the frame, means for actuating the plunger, feed rolls in the frame adapted to advance a stamp strip beneath the plunger, and clutch controlled means for intermittently actuating the rolls to throw the advancing means out of operation during the operation of the affixing device.

34. In a machine of the type set forth, the combination with a reciprocating stamp affixing plunger, and means for operating the plunger, of feeding rolls adapted to advance a stamp strip to the plunger, and clutch controlled means for intermittently operating the feed rolls actuated by the plunger to throw the advancing means out of operation during the operation of the affixing device.

35. In a machine of the type set forth, the combination with a run for the article to be stamped, of a direct acting slidable plunger adapted to strike a stamp against the surface of the article, means for intermittently feeding a stamp strip to the plunger, and means actuated by the passage of the article for actuating the feeding means to throw the feeding means out of operation during the operation of the affixing device.

36. In a machine of the type set forth, the combination with the frame of a direct acting stamp affixing plunger in the frame, rotary means for intermittently advancing the end of a stamp strip beneath the plunger, a shearing blade upon the plunger, and eccentric means operating the plunger and means for actuating the rotary means to throw the advancing means out of operation during the operation of the affixing means.

37. In a machine of the type set forth, the combination with a reciprocating direct acting stamp affixing plunger, and means for operating the same, of feed rolls actuated by the plunger operating means for intermittently advancing a stamp strip into the path of the plunger, means operated by the advancing envelop for throwing the affixing device into operation and means for locking the feed rolls against movement after each advance of the strip and means to throw the advancing means out of operation during the operation of the affixing means.

38. In a machine of the type set forth, the combination with a run for the article to be stamped, of a reciprocating direct acting stamp affixing plunger above the run, feed rolls for intermittently advancing a stamp strip into the path of the plunger, means for locking the feed rolls against movement after each advance of the strip, and rotary means actuated by the article upon the run for operating the plunger and feed rolls and means to throw the advancing means out of operation during the operation of the affixing means.

39. In a machine of the type set forth, the combination with the frame, of a reciprocating stamp affixing plunger mounted in the frame, a feed roll for advancing a stamp strip into the path of the plunger mounted in the frame, a second frame pivotally mounted in the first frame, a second feed roll mounted upon the second frame, yielding means for pressing the second roll into contact with the first roll, and means for actuating the feed rolls and rotary means for throwing the advancing means out of operation during the operation of the affixing device.

40. In a machine of the type set forth, the combination with the frame, of a reciprocating stamp affixing plunger mounted in the frame, a feed roll for advancing a stamp strip into the path of the plunger mounted in the frame and provided with guide flanges upon its ends, a second feed roll resting upon the first roll between the flanges, yielding means in the frame contacting with the second roll for pressing the second roll against the first roll, and means for actuating the feed rolls and rotary means for throwing the advancing means out of operation during the operation of the affixing device.

41. In a machine of the type set forth, the combination with a stamp affixing mechanism, of two feed rolls for advancing a stamp strip to the stamp affixing mechanism, one roll being provided with annular peripheral grooves, annular peripheral ribs upon the second roll adapted to register in the grooves, and means for actuating the rolls.

42. In a machine of the type set forth, the combination with a stamp affixing mechanism, of two feed rolls for advancing a stamp strip to the stamp affixing mechanism, one roll being provided with annular grooves, annular peripheral ribs upon the second roll adapted to register in the grooves, and means actuating the stamp affixing mechanism for operating the feed rolls.

43. In a machine of the type set forth, the combination with a stamp affixing mechanism, of two feed rolls for advancing a stamp strip to the stamp affixing mechanism, and means upon the feed rolls for creasing the advancing strip.

44. In a machine of the type set forth, the combination of a stamp feed roll provided with annular peripheral grooves, radial flanges upon the ends of the roll, a second feed roll in contact with the first roll between the flanges, and ribs upon the second roll registering in the grooves of the first roll.

45. In a machine of the type set forth, the combination with the stamp affixing mechanism, of means for feeding a stamp strip to the affixing mechanism, and means coöperating with the feeding means for creasing the advancing strip.

46. In a machine of the type set forth, the combination with the frame, of stamp affixing mechanism mounted in the frame, a feed roll mounted in the frame in alinement with the stamp affixing mechanism, a second frame pivotally mounted in the frame, a second feed roll loosely mounted upon one end of the second frame adapted to rest against the first feed roll, an arm upon the end of the second frame opposite the second feed roll, and means actuating the stamp affixing mechanism for operating the feed rolls.

47. In a machine of the type set forth, the combination with the frame, of stamp affixing mechanism mounted in the frame, a stamp feed roll for advancing a stamp strip to the affixing mechanism mounted in the frame, a second frame pivotally mounted in said frame, a second feed roll loosely mounted upon one end of the second frame and normally in contact with the periphery of the first feed roll, means for lifting the second feed roll out of contact with the first feed roll to permit adjustment of the strip relatively to the affixing mechanism and means coöperating with the stamp affixing mechanism for operating the feed rolls, and means for throwing the affixing device into operation and the feeding device out of operation.

48. In a machine of the type set forth, the combination with the stamp affixing mechanism and the reel for a stamp strip, of two frames, one pivotally mounted within the other, a pair of separable feed rolls one in each frame intermediate the stamp affixing mechanism and the reel, means for separating the rolls and means coöperating with the stamp affixing mechanism for operating the feed rolls, and means for throwing the affixing device into operation and the feeding device out of operation.

49. In a machine of the type set forth, the combination with the frame and envelop advancing means, of stamp affixing mechanism mounted in the frame, a reel for a stamp strip also mounted upon the frame, a pair of separable rolls mounted upon the frame between the reel and affixing mechanism adapted to feed the strip to the plunger, rotary means for throwing the envelop advancing means out of operation during the operation of the affixing mechanism and means upon the frame for indexing the forward movement of the strip.

50. In a machine of the type set forth, the combination with a reciprocating stamp affixing plunger and means for reciprocating the same, of feed rolls adapted to advance a stamp strip beneath the plunger, and means actuated by the plunger operating means for intermittently revolving the rolls a portion only of a revolution.

51. In a machine of the type set forth, the combination with a stamp affixing mechanism, of a pair of intermittently rotating stamp feed rolls, operative connections between the affixing mechanism and the rolls, and slidable means for locking the rolls after each rotary movement.

52. In a machine of the type set forth, the combination with a stamp affixing mechanism and means for operating the same and envelop advancing means, of feed rolls adapted to advance a stamp strip to the affixing mechanism, means actuated by the stamp affixing mechanism operating means for intermittently revolving the rolls a portion only of a revolution, rotary means for throwing the envelop advancing means out of operation during the operation of the affixing mechanism and a bolt for locking the rolls after each rotary movement.

53. In a machine of the type set forth, the combination with a reciprocating stamp affixing plunger and envelop advancing means, of intermittently rotating stamp feed rolls, operative connections between the plunger and the rolls, rotary means for throwing the envelop advancing means out of operation during the operation of the affixing mechanism and a bolt for locking the rolls after each rotary movement.

54. In a machine of the type set forth, the combination with a reciprocating stamp affixing plunger and envelop advancing means, of means for actuating the plunger, intermittently rotating feed rolls adapted to advance a stamp strip beneath the plunger, rotary means for throwing the envelop advancing means out of operation during the operation of the affixing mechanism and means operated by the plunger actuating means for rotating the rolls after each reciprocation of the plunger.

55. In a machine of the type set forth, the combination with a reciprocating stamp affixing plunger and envelop advancing means, of means for actuating the plunger, intermittently rotating feed rolls adapted to advance the stamp strip beneath the plunger, means operated by the plunger actuating means for actuating the rolls after each reciprocation of the plunger, rotary means for throwing the envelop advancing means out of operation during the operation of the affixing mechanism and means for locking the rolls after each movement.

56. In a machine of the type set forth, the combination with the frame, of a plunger slidably mounted in the frame, a driving shaft in the frame, operative connections between the plunger and driving shaft, a roll shaft also mounted in the frame, a crank disk upon the driving shaft, an arm loose upon the roll shaft, a rod connecting the crank disk and arm, a toothed wheel fixed to the roll shaft, a pawl upon the arm contacting with the toothed wheel, a gear fixed to the roll shaft, a feed roll upon the roll shaft, a second roll shaft in the frame, a feed roll upon the second roll shaft, and a gear upon the second roll shaft meshing with the first gear.

57. In a machine of the type set forth, the combination with the frame, of a plunger slidably mounted in the frame, a driving shaft in the frame, operative connections between the plunger and driving shaft, a roll shaft also mounted in the frame, a crank disk upon the driving shaft, means connecting the driving shaft and roll shaft for rotating the roll shaft, a partial revolution, a disk provided with interspaced recesses fixed to the roll shaft, a bolt slidably mounted in the frame adjacent the recessed disk, spring means for pressing the bolt into the recesses of the disk, a cam shoulder upon the crank disk, a lever pivotally mounted intermediate its length upon the frame having one end in the path of the cam shoulder and its opposite end engaging the bolt, a feed roll upon the roll shaft, a second roll shaft in the frame, a feed roll upon the second shaft, and gear connections between the roll shafts.

58. In a machine of the type set forth, the combination with a run, means for feeding the article to be stamped along the run, and a stamp affixing mechanism, of a tripping device in the path of the advancing article for actuating the affixing mechanism, and means for holding the tripping device out of operation throughout the advance of the article.

59. In a machine of the type set forth, the combination with a stamp affixing device and an envelop feeding device, of rotary means for throwing the affixing device into operation and the feeding device out of operation simultaneously.

60. In a machine of the type set forth, the combination with a stamp affixing device and an envelop feeding device, of means for throwing the affixing device into operation and the feeding device out of operation, and means for throwing the feeding device into operation immediately after the action of the affixing mechanism.

61. In a machine of the type set forth, the combination with the frame, of a reciprocating stamp affixing plunger mounted in the frame, a feed roll for advancing a stamp strip into the path of the plunger mounted in the frame, a second frame pivotally mounted in the first frame, a second feed roll loosely mounted upon one end of the second frame, yielding means for pressing the second roll into contact with the first roll, means for actuating the feed rolls, envelop advancing means, and means for throwing the envelop advancing means out of operation during the operation of the affixing mechanism.

62. In a machine of the type set forth, the combination with a stamp affixing device and an envelop feeding device, of means for throwing the affixing device into operation and the feeding device out of operation simultaneously, and means for throwing the feeding device into operation immediately after the actuation of the affixing mechanism.

63. In a machine of the type set forth, the combination with a stamp affixing device, a flap moistening device, and means for feeding the envelop to the affixing device, of a sealing device, and means controlled by the passage of the envelop for automatically throwing the sealing device into inoperative position and the stamp affixing device into operative position.

64. In a machine of the type set forth, the combination with a run, of a plunger above the run, loosely mounted means carrying said plunger, a rock shaft, an arm upon the shaft engaging the plunger, means for cushioning said plunger and means for actuating the shaft.

65. In a machine of the type set forth, the combination with a run, of a plunger above the run, a loosely mounted arm carrying said plunger, a rock shaft, an arm yieldingly mounted upon the shaft and engaging the plunger and means for actuating the shaft.

66. In a machine of the type set forth, the combination with a run, of a plunger above the run provided with an orifice, a rock shaft, an arm yieldingly mounted upon the shaft and loose in the orifice, an arm fast on said shaft and supporting the yielding means and means for actuating the shaft.

67. In a machine of the type set forth, the combination with the frame and a stamp affixing mechanism mounted therein, of two feed rolls in the frame adjacent the affixing mechanism and movable toward and away from each other, one of the rolls being provided with ink projections, a spring in the frame contacting with one roll for pressing said roll against the other roll, and means coöperating with the affixing mechanism for operating the rolls and means for throwing the feeding device into operation immediately after the action of the affixing mechanism.

68. In a machine of the type set forth, the combination with a stamp affixing mechanism, a pair of rolls constructed to feed a stamp strip to said affixing mechanism, means coöperating with the affixing mechanism for operating said feed rolls, means for throwing the feed rolls into operation immediately after the action of the affixing mechanism, and marking means coöperating with one of the feed rolls.

69. In a machine of the type set forth, the combination with a direct acting stamp affixing plunger and means for operating the same, of a driving shaft, a clutch connecting the driving shaft and the plunger operating means, and means in the path of an advancing envelop for operating the clutch, said last-named means being pivoted to be thrown out of the path of the envelop when the latter is not to be stamped.

70. In a machine of the type set forth, the combination with a direct acting stamp affixing plunger and means for operating the same, of a mechanism for feeding stamps to the plunger actuated by the plunger operating means, a driving shaft, a clutch connecting the driving shaft and the plunger operating means, and means in the path of an advancing envelop for operating the clutch, said last-named means being pivoted to be thrown out of the path of the envelop when the latter is not to be stamped.

71. In a machine of the type set forth, the combination with means for moistening the face of an envelop, of means for feeding the moistened envelop to a stamp affixer, means automatically actuated by the moving envelop for throwing said envelop feeding means out of operation during the operation of the affixing mechanism and for throwing the affixing mechanism into operation, said means comprising an element lying normally in the path of the envelop and mounted to be thrown out of the path of the envelop when the latter is not to be stamped.

72. In a machine of the type set forth, the combination with a stamp affixer, means for feeding an envelop thereto, means for throwing the envelop feeding means out of operation during the operation of the affixing mechanism and for throwing the latter into operation, said means comprising an element lying normally in the path of the envelop and mounted to be thrown out of the path of the envelop when the latter is not to be stamped.

73. In a machine of the type set forth, the combination with non-rotatable means for moistening the face of an envelop, said means being mounted to be thrown into inoperative position by the moving envelop, and stamp affixing means, of means for feeding an envelop thereto, means for throwing the envelop feeding means out of operation during the operation of the stamp affixing mechanism and for throwing the latter into operation, and means normally lying in the path of the envelop and automatically actuated by the latter for controlling the actuation of said feed controlling means.

74. In a machine of the type set forth, the combination with a stamp affixer, and means for feeding an envelop thereto, of non-rotatable means independent of the envelop feeding means for moistening the face of an envelop prior to its being fed to the stamp affixing means, said moistening means being mounted to be thrown into inoperative position by the moving envelop and means controlled by a movable element normally in the path of the moving envelop for automatically throwing the envelop feeding means out of operation during the operation of the affixing mechanism and for automatically throwing the latter into operation.

75. In a machine of the type set forth, the combination with a stamp affixer, means for feeding an envelop thereto, means for throwing the envelop feeding means out of operation during the operation of the affixing mechanism and for throwing the latter into operation, said means embodying a member mounted to be thrown out of the path of the envelop when the latter is not to be stamped, and envelop moistening means operative prior to the feeding of the envelop to the stamp affixing means.

76. In a machine of the type set forth, the combination with a stamp affixing device and a device for feeding an envelop to the affixing device, of a sealing device disposed horizontally in alinement with the feeding means, and means continuously operating the sealing device for intermittently actuating the stamp affixing device.

77. In a machine of the type set forth, the combination with a stamp affixing device, and a device for feeding an envelop to the affixing device, of a sealing device disposed horizontally in alinement with the feeding means, and means continuously operating the sealing device for intermittently actuating the feeding device.

78. In a machine of the type set forth, the combination with a stamp affixing device, and means for feeding an envelop to the affixing device, of a sealing device disposed horizontally in alinement with the feeding means, means for operating the sealing device continuously, and means controlled by the passage of the envelop for automatically throwing the feeding means into inoperative position and the affixing device into operative position.

79. In a machine of the type set forth, the combination with the frame and the run, of a plunger mounted in the frame above the run, feed rolls in the run at one side of the plunger, a finger pivotally mounted intermediate its length upon the frame adjacent the plunger and movable into the path of the envelop upon the run, a driving shaft, a clutch upon the shaft, operative connections between the shaft and rolls, operative connections between the shaft and plunger, and lever connections between the end of the finger and the clutch.

In testimony whereof I have affixed my signature in presence of two witnesses.

CHARLES F. DAVIS.

Witnesses:
 HORATIO E. BELLOWS,
 JOSEPH E. BURNS.